(12) United States Patent (10) Patent No.: US 10,121,393 B1
Snyder (45) Date of Patent: Nov. 6, 2018

(54) METALIZED/HOLOGRAPHIC WINDOW GRAPHICS

(71) Applicant: Jeffrey W Snyder, Mendham, NJ (US)

(72) Inventor: Jeffrey W Snyder, Mendham, NJ (US)

( * ) Notice: Subject to any disclaimer, the term of this patent is extended or adjusted under 35 U.S.C. 154(b) by 18 days.

(21) Appl. No.: 15/155,862

(22) Filed: May 16, 2016

Related U.S. Application Data

(60) Provisional application No. 62/238,967, filed on Oct. 8, 2015.

(51) Int. Cl.
| | | |
|---|---|---|
| *G09F 7/00* | (2006.01) | |
| *B32B 37/14* | (2006.01) | |
| *B32B 37/12* | (2006.01) | |
| *B32B 38/00* | (2006.01) | |
| *G09F 7/18* | (2006.01) | |

(52) U.S. Cl.
CPC ............ *G09F 7/00* (2013.01); *B32B 37/12* (2013.01); *B32B 37/14* (2013.01); *B32B 38/145* (2013.01); *G09F 7/18* (2013.01); *B32B 2590/00* (2013.01); *G09F 2007/1856* (2013.01)

(58) Field of Classification Search
CPC ............ G09F 3/203; G09F 7/00; G09F 21/04
See application file for complete search history.

(56) References Cited

U.S. PATENT DOCUMENTS

| | | | | |
|---|---|---|---|---|
| 4,864,755 A * | 9/1989 | Owens | ..................... | G09F 3/203 283/81 |
| 7,596,899 B1 * | 10/2009 | Michael | ................... | G09F 19/22 362/249.04 |
| 8,318,279 B1 * | 11/2012 | Kassab | ................... | G09F 3/203 40/593 |
| 2003/0009921 A1 * | 1/2003 | McAllister | .............. | G09F 3/005 40/299.01 |
| 2005/0108910 A1 * | 5/2005 | Esparza | .................. | G09F 21/04 40/600 |
| 2006/0260162 A1 * | 11/2006 | Ballinger | .................. | G09F 7/12 40/591 |
| 2008/0052973 A1 * | 3/2008 | Mullins | .................... | G09F 21/04 40/593 |
| 2009/0241391 A1 * | 10/2009 | Sanford | .................... | G09F 3/10 40/593 |
| 2009/0249666 A1 * | 10/2009 | Conant | ................... | B41M 3/008 40/584 |
| 2010/0018087 A1 * | 1/2010 | Erickson | ................. | G09F 19/22 40/1 |
| 2012/0137551 A1 * | 6/2012 | Limber | ..................... | G09F 7/12 40/544 |
| 2013/0302591 A1 * | 11/2013 | Timmerman | ........... | B32B 9/045 428/319.9 |

* cited by examiner

*Primary Examiner* — Gary C Hoge
(74) *Attorney, Agent, or Firm* — Levine Mandelbaum PLLC

(57) ABSTRACT

A window cling has a metalized laminate affixed to a surface of a base sheet by an adhesive. The opposite side of the base sheet can be coated with a low-tack adhesive and covered with a release liner which can be peeled away for affixing the window cling to the glass of a window. Where the base sheet is a static cling it can be applied directly to the glass without an adhesive. An image of text and/or graphics can be printed on the exposed surface of the metalized laminate unreversed. Where the base sheet is transparent, another image of text and/or graphics can be printed on a surface of the base sheet reversed before affixation of the printed base sheet surface to the metalized laminate for viewing unreversed through the unprinted side of the transparent base sheet.

17 Claims, 9 Drawing Sheets

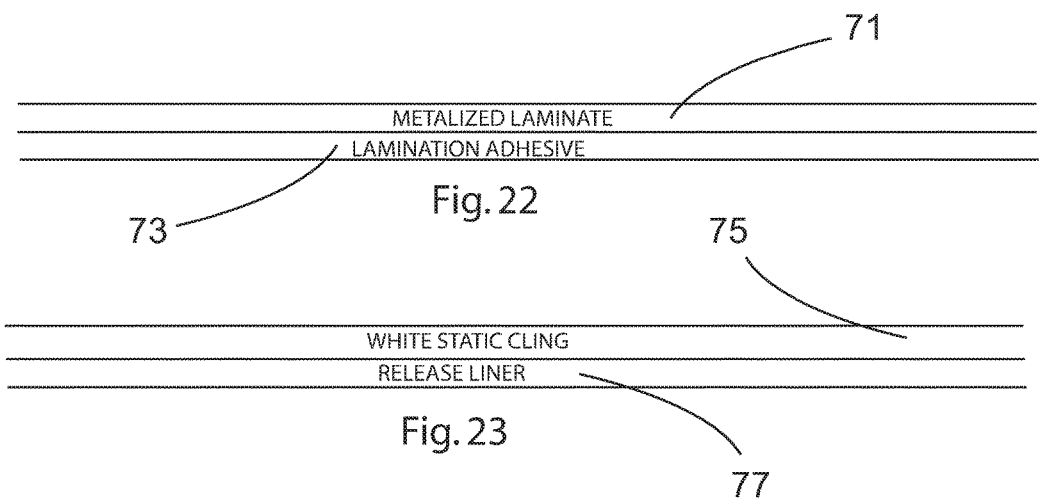
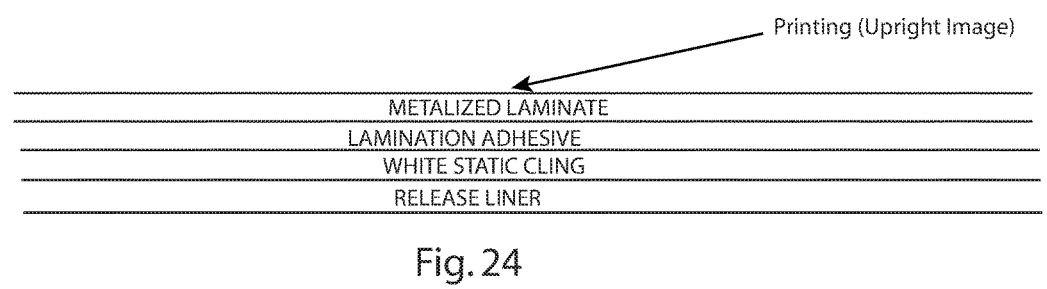

METALIZED/HOLOGRAPHIC WINDOW GRAPHICS

BACKGROUND OF THE INVENTION

The present invention is a novel window cling and method of making such a window cling. More specifically, the invention teaches the construction of a window cling by laminating a metalized and/or holographic metalized film to a substrate.

Basic window graphics are printed on either a clear or white substrate which may or may not contain an adhesive to help secure it to the window.

Window graphics can typically be viewed from either one or two sides.

The metal window graphics can be configured to be viewed from either one or two sides depending on the user's preference, and can be applied to either the white or clear base sheet.

In the case of two sided metal window graphics a clear base sheet is used. Typical base sheets now used in the market include clear static cling or a clear pressure sensitive sheet formed from one or more of vinyl, OPP (oriented polypropylene), BOPP (biaxially oriented polypropylene), PET, also known as PETE (polyethylene terephthalate), BOPET (biaxially oriented polyethylene terephthalate), APET (amorphous polyethylene terephthalat), PETG (polyethylene terephthalate glycol-modified) or any other clear sheet that will or can be made to adhere to glass as a base, vinyl, OPP and PET being the most popular base sheets presently in use in the marketplace, in that order.

It is known in the prior art to make a two sided window graphic. The first step in doing so is to reverse print an image on a clear plastic base sheet. When printing this image, it has been necessary to first lay down the colors to form the image followed by, if necessary, laying down a flood color of white or multiple flood colors of white to then cover the image. This is done to opaque out the first reverse image that was printed after which a second image may be printed on top of the original image and flood of colors or white for viewing from the opposite side of the base sheet, thus creating a two-way window graphic.

There are a multitude of ways to achieve opacity for blocking the first reverse image from a second unreversed or upright image. For example, many layers of white ink may be applied followed by a base silver/gray for opacity, then more layers of white. Another method is to lay down multiple layers of white ink until the desired opacity is achieved. This may be done through repeated printing cycles on an offset printing press, silk screen press or newer digital printing presses. Another option that is commonly used is the application of a white barrier lamination film to the first pass of the reverse printed image, blocking out that image in its entirety, and providing a white base onto which to lay down the second image.

While the aforementioned prior art methods and the two sided window clings that they produce are acceptable, they do not offer the benefits or advantages of the present invention.

SUMMARY OF THE INVENTION

Instead of using multiple layers of white, one on top of another to achieve the desired opacity, a metalized/holographic film layer serves as a light shielding layer for providing opacity between the first and second images. The light shielding metalized/holographic film layer gives the window cling graphic a unique and desirable appearance not presently available. Some of the colors/inks used in printing the first reverse image can be translucent and others opaque. Optionally, a layer of opaque white may be applied in some areas while no ink is applied in others.

It is therefore an object of the invention to make a window cling including, a base sheet having a first surface and an opposite second surface, a metalized laminate having a first surface and an opposite second surface, and a layer of lamination adhesive in contact with the first surface of the base sheet and the second surface of the metalized laminate for adhering the base sheet and metalized laminate together.

Another object of the invention is to make a window cling wherein the base sheet can be a static cling.

Still another object of the invention is to make a window cling with the metalized laminate optionally printed with an upright image, that is, an image that is unreversed.

A further object of the invention is to make a window cling with a transparent base sheet that is printed with a second image in reverse so that it is visible through the base sheet unreversed.

Still a further object of the invention is to make a window cling wherein at least one or more portions of a printed image are translucent for allowing light reflected by the metalized laminate to be transmitted through the image.

Other and further objects of the invention will be apparent from the following drawings and description of nine preferred embodiments of the invention.

DESCRIPTIONS OF THE DRAWINGS

FIG. 22 is a schematic side elevation view of a first component of an eighth embodiment of the invention.

FIG. 23 is a schematic side elevation view of a second component of the eighth embodiment of the invention.

FIG. 24 is a schematic side elevation view of the eighth embodiment of the invention.

DESCRIPTION OF THE PREFERRED EMBODIMENTS

Figure 1:
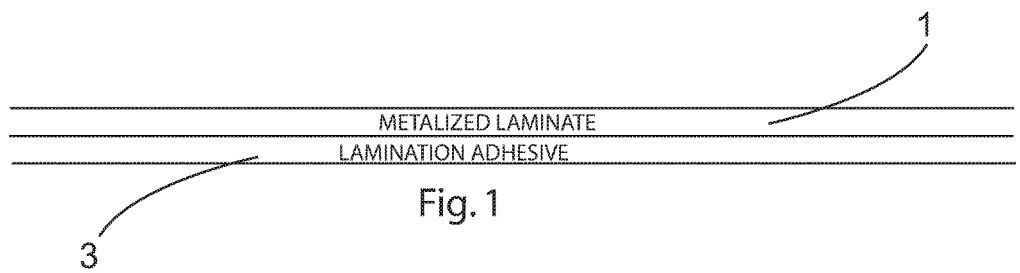
FIG. 1 is a schematic side elevation view of a first component of a first embodiment of the invention.

A two sided window sign, hereinafter sometimes referred to as a "window cling", "cling" or "window graphic", can be printed by first printing a reverse (mirror) image on one side of a base sheet substrate ("base sheet"), hereinafter sometimes referred to as a "first side printing". After the reverse image is printed on the base sheet, a metalized/holographic film is laminated over that image. The window cling then undergoes a second pass of printing on the metalized/holographic film, hereinafter sometimes referred to as a "second side printing", with the same translucent, opaque white or no ink combination to create a two sided window graphic with the effect of the metalized/holographic film showing through to create a unique and exciting visual effect on both sides of the window graphic. The metalized/holographic film reflects light through the translucent inks, and any clear areas. The metalized/holographic film is not visible through the white opaque areas.

The second printing pass is optional. If no further printing is done, a one sided graphic window cling is obtained with the reflective aesthetic effect of the metalized laminate.

Another benefit of the invention is a cost savings due to the ability of the metalized film to block the transmission of light through the basic sheet. The number of white ink layers can be greatly reduced, if not entirely eliminated, due to the light shielding characteristics of the metalized film layer. Laminating the metalized film layer onto the base sheet and adding minimal white is less costly than repeatedly applying layers of white ink or a more expensive multi-layer white barrier film.

A window cling having one sided metal window graphics can be prepared starting with either a clear base sheet, as in the case of the previously described two sided window graphics, or a white base sheet.

Clear base sheets can include clear static cling or a clear pressure sensitive sheet using either vinyl, OPP, PET, APET, PETG or any other clear base sheet that will adhere to glass, vinyl, OPP, PET being the most popular base sheets presently being used, in that order. As in the two sided window graphic, a first printing pass is made wherein an image is printed in reverse, i.e., mirror image. A metalized/holographic film is then laminated to the base sheet over the reverse image made in the first pass of printing. The result is a one sided window cling presenting a view of a metalized/holographic effect only on one side.

White base sheets may include white static cling or white pressure sensitive sheets of Vinyl, OPP, PET, Styrene or Paper, or any white sheet material that will adhere to glass. When starting with a white base sheet, prior to any printing, the metalized/holographic film is laminated to the base sheet on the side opposite the one that is to adhere to the glass, A single pass of printing is then done on the exposed surface of the applied metalized/holographic film.

Repeating the previously described print sequence with translucent colors and white opaque ink and, in some areas, printing no color so that there is complete transparency, a unique one sided window graphic can be created with the metalized/holographic film showing through, thereby creating a unique and exciting visual effect on one side of the window graphic.

The metalized/holographic film has a unique and novel effect. Placement of the metalized or holographic film in the images provides a light shielding layer which prevents one of the printed layers from being seen while the other printed layer is viewed which would, otherwise, compromise the presentation or readability of the window sign. Another advantage of this placement is that, by the way a metalized/holographic film is laminated between the images, one can create an exciting visual effect of metal coming through the translucent ink to give the color a chrome-like reflective or holographic appearance. In areas where this effect is not desired, an opaque white ink can be used to block light reflected from the metalized/holographic film. In areas where an unobstructed view of the metalized/holographic layer is desired no ink is printed, hence, one can see straight though the clear base sheet to the metalized/holographic film. The visual effects presented by the images on one print side and the other print side can differ depending on how the ink combinations are laid down. The visual effects can also be varied depending on the laminated metalized film or holographic metalized film selected to be the middle layer, i.e., the layer between the images.

There are many metalized films available in many shades of silver, and a large number of colors and various holographic metalized patterns. Custom holographic pattern films can be ordered and manufactured for brand identity.

Metalized/holographic films are selected as follows. The metalized/holographic films must be light shielding. To achieve this, it is necessary to use a metalized/holographic film with an optical density of 1.0 to 4.0 so that light transmission through the window sign will be blocked. A metalized/holographic film with an optical density of 2.0 to 3.0 is most common in the marketplace.

One commercially available film is Flex Film F-CLR-A1-M, a 48 gauge silver metalized polyester film, which is manufactured by UFLEX. Others in the marketplace will be suitable as well.

Another commercially available holographic metalized film is available from Spectratek Technologies of Los Angeles Calif. An example is the crystals pattern metalized holographic film in 48 gauge thickness. Others in the marketplace will be suitable as well, with almost an infinite number of patterns possible.

Typical films that can be used for the aforementioned application range from 48 gauge to 5 mils in thickness, with 48 gauge and 92 gauge being the most common.

The metalized/holographic base films can be manufactured using PET, OPP, Nylon, e.g., BOPA (biaxially oriented nylon), acetate, e.g., cellulose diacetate, and Vinyl; PET being the most common, and others.

Base sheet substrates can be clear or white. A clear base sheet is used in the preparation of a two sided window graphic. Either a clear base sheet or an opaque, typically white, base sheet can be used for single sided printing.

Static cling vinyl ranging from 3 to 10 mils thick, typically 6 to 8 mil, is most common. Transilwrap Company offers such a product called Trans-Flex-Cast™ Static Cling Vinyl in clear or white. Clear must be used for a two sided window graphic, while clear or white can be used in a one sided window graphic.

Pressure sensitive vinyl sheets ranging from 3 to 10 mils thick, typically 3 to 6 mils, are most common. Transilwrap offers Trans-Cling II™ Low Tack and Stick Mate™ Permanent. These are offered in clear and white. Clear must be used for a two sided window graphic, while clear or white can be used in a one sided window graphic.

OPP polypropylene sheets ranging from 2 to 10 mils thick, typically 2-3 mils, are most common. Transilwrap offers Trans-Cling™ OPP in both clear and white. Clear must be used for a two sided window graphic, while the white can be used in a one sided window graphic.

PET polyester sheets ranging from 2 to 10 mils thick, typically 2 to 6 mils, are most common. Transilwrap offers Trans-Clingm PET in both clear and white. Clear must be used for a two sided window graphic, while clear or white can be used in a one sided window graphic.

APET or PETG sheets ranging from 6 to 20 mils thick, typically 10 mils, a common thickness rarely used in window graphics, make suitable clear base sheets for the present application.

As previously noted, for a one sided window graphic either a clear base sheet or a white base sheet can be used. The following materials can be used as white base sheets for one sided metalized/holographic window graphics.

Rigid Vinyl (PVC) ranging from 6 to 20 mils thick, not supplied with an adhesive for glass, can be used for a one sided window graphic irrespective of whether or not it is opaque. Adhesive is added when the window graphic is prepared.

Transilwrap offers TransBlock™ 10 mil white opaque vinyl which is suitable as a white base sheets for one sided metalized/holographic window graphics.

Rigid OPP-ranging from 6 to 12 mils thick, not supplied with an adhesive for glass, can be used irrespective of whether or not it is opaque for a one sided window graphic. Adhesive is added when the window graphic is prepared.

Transilwrap also offers TransPaque™ 8 to 12 mil white opaque polypropylene sheet which, too, is suitable as a white base sheet for one sided metalized/holographic window graphics.

Styrene ranging from 6 to 20 mils thick, with 10 mils most common, not supplied with an adhesive for glass, can be used for a one sided window graphic irrespective of whether or not it is opaque. Adhesive is added when the window graphic is prepared.

Paper ranging from 4 pt to 24 pt in thickness, 8-12 pt being most common, not supplied with an adhesive for glass, can be used irrespective of whether or not it is opaque for a one sided window graphic. Adhesive is added when the window graphic is prepared.

The lamination process for a two sided window graphic is as follows.

After the first side printing has been performed on the base sheet, the sheet is laminated with a metalized/holographic film. The printed base sheets to be laminated with the metalized/holographic film are continuously fed into the laminating press in a stream, each sheet overlapping the next one by about inch or less. At this time, the metalized/holographic film is unwound from a spool and undergoes a treatment which depends on the process elected for laminating the film to the base sheets.

In a wet laminating process, the film is coated with a water based adhesive and any excess water is dried off. Then the metalized/holographic film and base sheets are brought together in a laminator and a combination of heat and pressure causes the adhesive to form a bond joining the metalized/holographic film to the first side printing on the base sheets. When the stream of connected laminated sheets exits the laminator it is cut and separated into individual sheets which are stacked and then readied for the second side printing of the window graphic.

In the wet laminating process, one commercially available liquid adhesive found to be satisfactory is MOR-GLOSS™ 552A used in combination with a co-reactant MOR-GLOSS™ CR40-B, each of which is manufactured by Dow Chemical Corporation. Many other adhesives will work in the invention as will be known to those skilled in the art. A solvent-based or Ultra Violet (UV) curing style may be suitable as well.

In a thermal laminating process a commercially available metalized/holographic film is purchased from a supplier such as Transilwrap Company in Franklin Park, Ill. This style of film comes coated with a thermal setting adhesive and requires heat and pressure to activate and form the lamination. While the sheets are fed, the film is unwound and heated to activate the thermal setting adhesive on the supplied film. The film is adhered to the side of the base sheet having the first printing. When the stream of base sheets exits the laminator it is cut and separated into individual sheets which are stacked and readied for the second side printing of the window graphic.

In a PSA lamination process, a commercially available metalized/holographic film is obtained from a supplier such as Griff Decorative Films in Lakewood, N.J. This style of film comes with a pressure sensitive adhesive and release liner on it, and only requires pressure, with minor heat optional, to join the metalized/holographic film to the base sheets. As the sheets are fed through a laminator, the release liner is removed from the metalized/holographic film thereby exposing the pressure sensitive adhesive. By application of pressure and optional minor heat, the film is joined to the first printed side of the base sheet. When the stream of sheets exits the laminator it is cut and separated into individual sheets which are then stacked and readied for the second side printing of the window graphic.

A one sided window graphic can be prepared using a clear base sheet or a white base sheet.

When a clear base sheet is used to make a one sided window graphic the printing procedures and steps described above for preparing the first side of a two sided window graphic are followed. The one sided window graphic is then laminated using one of the three laminating methods previously detailed, viz., wet, thermal or PSA. After lamination, the sheets are separated and stacked and the one sided window graphic is then complete.

When white base sheets are used to make one sided window graphics, before any printing is done, the white base sheets are fed into the laminating press in a continuous stream, overlapping each sheet one onto the other about inch or less. At this time, the metalized/holographic film unwinds and undergoes a treatment which depends on the process elected for laminating the film to the base sheet. One of the three methods for the laminating process, as previously detailed above, viz. wet, thermal or PSA, is used. When the stream of sheets exits the laminator the stream is cut and separated into individual sheets which are then stacked and readied for the first side printing of the window graphic.

White base sheets that are not precoated with an adhesive may require an additional step of laminating an adhesive and liner to the sheets so they will adhere to a glass window, depending on the type of selected white base sheet.

When printing a two sided window graphic using a metalized/holographic film, a clear base sheet is selected.

Typical printing processes which can be used are Offset printing, silk screen printing and digital printing. Nano printing also works but may not yet commercially available. The preferred printing methods are UV offset, UV silk screen or digital. These preferred printing methods facilitate good ink adhesion to the base sheet and also allow a sheet to be printed without the use any offset spray powders Conventional printing methods used with offset spray type powders can reduce the quality of the finished window graphic. Such methods make it possible that contamination from the offset spray powders finds its way into the highly reflective metalized/holographic lamination, thereby degrading the overall appearance of the window sign.

The first printing step is to reverse print an image on the clear base sheet. Using a combination of translucent inks and opaque white in select areas, respectively, and no ink in other areas, a printer can custom design an image by allowing the metalized/holographic film to show through the translucent inks and clear unprinted areas in order to enhance the appearance of the window graphic. After printing of the first image is complete the metalized/holographic film is laminated to the printed sheet over the first image.

The second print step is to print a second image on the second side of the sign. The same process described above to print the first image on the first side is employed to print the second image on the second side of the sign. The second image may be, but need not be, the same as the first image. Due to the light shielding property of the opaque metalized/holographic film, the first side image and second side image can be entirely different as neither one will be visible through the window graphic when the other is viewed. Hence not only does the metalized/holographic film layer provide the window graphic with an aesthetically pleasing appearance, it performs the function of isolating from one another the two images in a two-sided window graphic.

The method of printing the one sided window graphic depends on whether a clear base or a white base sheet is employed.

When using a clear base sheet, the steps detailed above for printing a first image, i.e., on the first side of the window graphic, are followed. Thereafter, the metalized/holographic film is applied over the printing and the one sided window graphic complete.

When using a white base sheet, the metalized/holographic film is applied to the white base sheet before printing occurs. The same printing process as previously detailed above for the first side of the window graphic is followed with the exception that the image is not reversed printed, but is printed unreversed and upright, so that it is right reading. After printing the first side, unreversed and right reading, the one sided window graphic is complete.

In order to prepare a window cling with a two sided window graphic clear base sheet with low tack or permanent adhesive the following steps are taken.

Referring to FIG. 1, a metalized laminate 1 is prepared by depositing a thin layer of metal on one side of a clear plastic film. A lamination adhesive 3 is then applied to the metalized laminate 1, preferably on the side of the film on which the layer of metal has been deposited.

Figure 2:
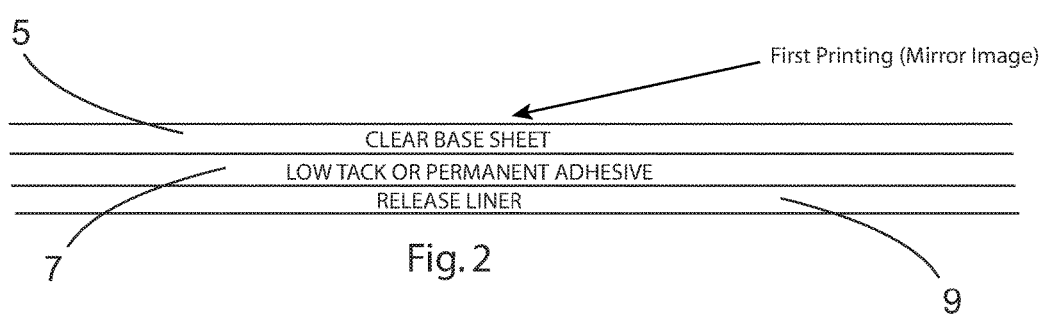
FIG. 2 is a schematic side elevation view of a second component of the first embodiment of the invention.

One side of a clear base sheet 5 shown in FIG. 2 is coated with a low tack or permanent adhesive 7 which is then covered with a release liner 9 to protect the Low tack or permanent adhesive 7.

The surface of the clear base sheet 5 opposite the surface coated with the low tack or permanent adhesive 7 is then printed (first printing) with text and or graphics, in reverse (mirror image). The printed text and or graphics may be opaque or translucent, in whole or in part, depending on whether and where the metal laminate is to be visible through the printing to form the construction shown.

Figure 3:
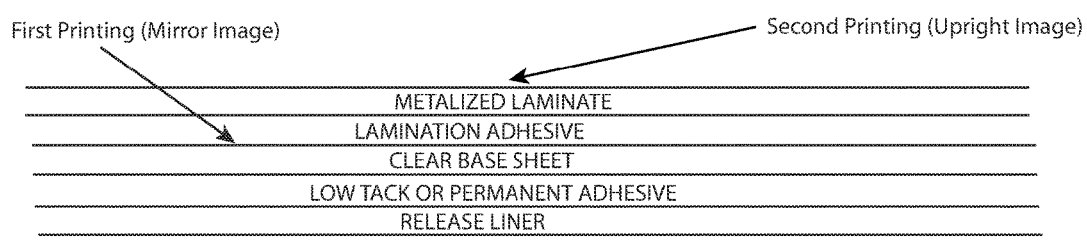
FIG. 3 is a schematic side elevation view of the first embodiment of the invention.

Thereafter the metalized laminate 1 is bonded to the side of the clear base sheet 5 opposite the side having the Low tack or permanent adhesive 7 covered by the release liner 9 by a lamination adhesive 3 to form the window cling shown in FIG. 3 which may then undergo a second printing of upright text and or graphics on the film side of the metal laminate. The first printing, in mirror image, and second printing are entirely independent of one another and neither can be seen when the other is viewed due to the light blocking effect of the opaque metal laminate.

The release liner 9 is peeled away from the clear base sheet 5 just before the window cling is to be applied to the surface of a window.

In order to prepare a static window cling with a two sided window graphic clear base sheet with no adhesive the following steps are taken.

Figure 4:
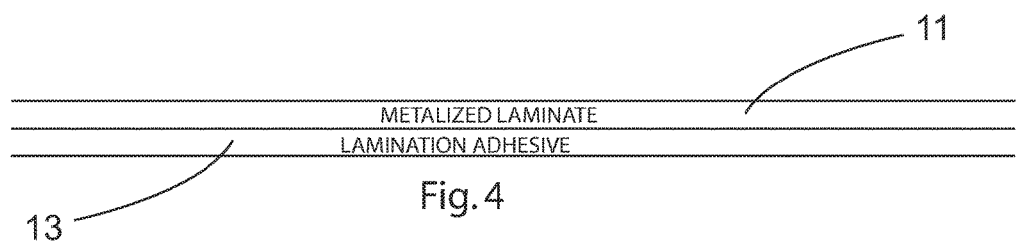
FIG. 4 is a schematic side elevation view of a first component of a second embodiment of the invention.

Referring to FIG. 4, a metalized laminate 11 is prepared by depositing a thin layer of metal on one side of a clear plastic film. A lamination adhesive 13 is then applied to the metalized laminate 11, preferably on the side of the film on which the layer of metal has been deposited.

Figure 5:
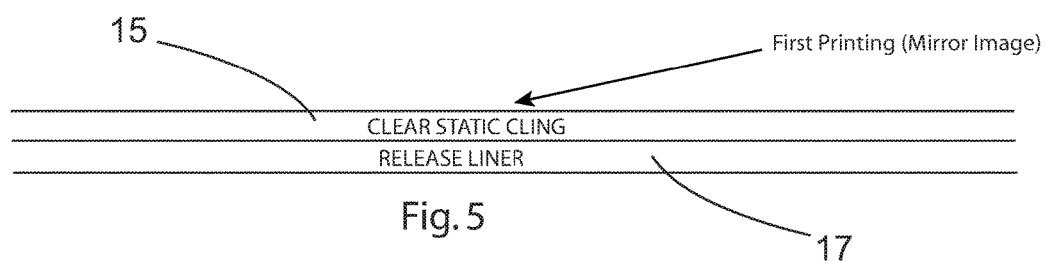
FIG. 5 is a schematic side elevation view of a second component of the second embodiment of the invention.

One side of a clear static cling 15 shown in FIG. 5 is covered with a release liner 17.

The surface of the clear static cling 15 opposite the surface with the release liner 17 is then printed (first printing) with text and or graphics, in reverse (mirror image). The printed text and or graphics may be opaque or translucent, in whole or in part, depending on whether and where the metal laminate is to be visible through the printing to form the construction shown.

Figure 6:
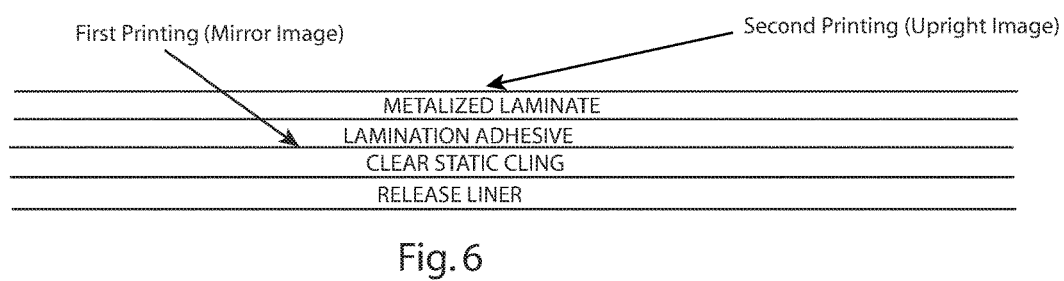
FIG. 6 is a schematic side elevation view of the second embodiment of the invention.

Thereafter the metalized laminate 11 is bonded to the side of the clear static cling 15 opposite the side covered by the release liner 17 by a lamination adhesive 13 to form the window cling shown in FIG. 6 which may then undergo a second printing of upright text and or graphics on the film side of the metal laminate. The first printing, in mirror image, and second printing are entirely independent of one another and neither can be seen when the other is viewed due to the light blocking effect of the opaque metal laminate.

The release liner 17 is peeled away from the clear static cling 15 just before the window cling is to be applied to the surface of a window.

In order to prepare a window cling with a two sided window graphic clear base sheet with no adhesive the following steps are taken.

Figure 7:
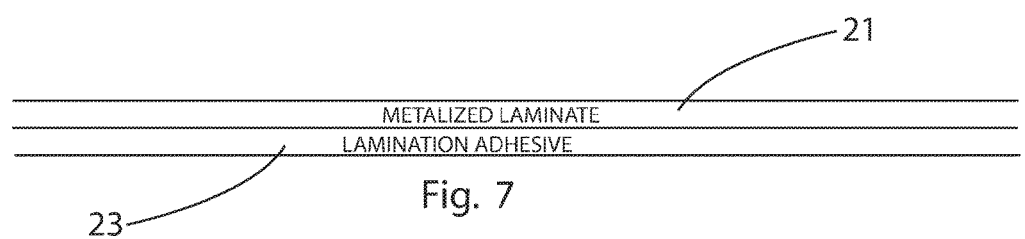
FIG. 7 is a schematic side elevation view of a first component of a third embodiment of the invention.

Referring to FIG. 7, a metalized laminate 21 is prepared by depositing a thin layer of metal on one side of a clear plastic film. A lamination adhesive 23 is then applied to the metalized laminate 21, preferably on the side of the film on which the layer of metal has been deposited.

Figure 8:
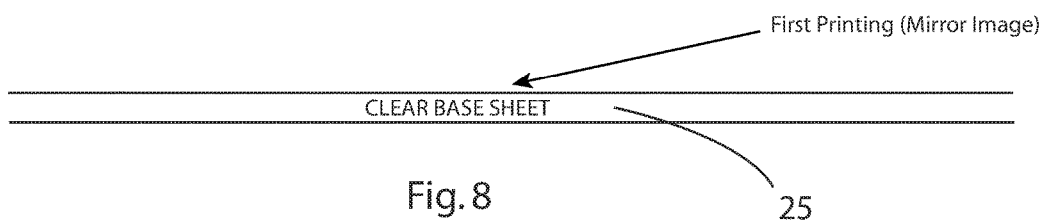
FIG. 8 is a schematic side elevation view of a second component of the third embodiment of the invention.

A surface of a clear base sheet 25, shown in FIG. 8, is printed with text and or graphics, in reverse (mirror image). The printed text and or graphics may be opaque or translucent, in whole or in part, depending on whether and where the metal laminate is to be visible through the printing to form the construction shown.

Figure 9:
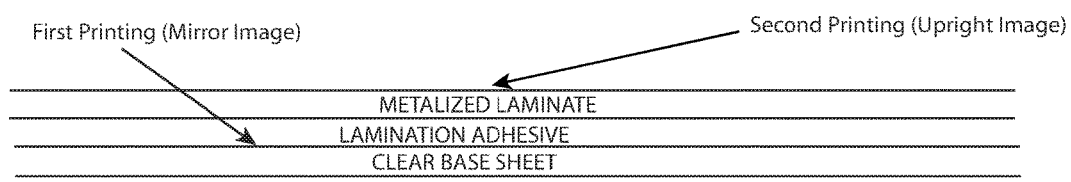
FIG. 9 is a schematic side elevation view of the third embodiment of the invention.

Thereafter the metalized laminate 21 is bonded to the side of the clear base sheet 25 having the first printing to form the window cling shown in FIG. 9 which may then undergo a second printing of upright (unreversed) text and or graphics on the film side of the metal laminate. The first printing, in mirror image, and second printing are entirely independent of one another and neither can be seen when the other is viewed due to the light blocking effect of the opaque metal laminate. An adhesive (not shown), e.g., of the liquid, low tack, or permanent type may be applied to the surface of the clear base sheet 25 opposite the metal laminate before applying the window cling to a window in order to enhance adhesion of the cling to the glass surface of the window.

In order to prepare a window cling with a one sided window graphic clear base sheet with low tack or permanent adhesive the following steps are taken.

Figure 10:
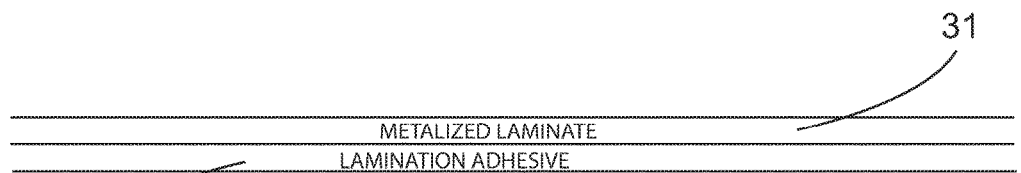
FIG. 10 is a schematic side elevation view of a first component of a fourth embodiment of the invention.

Referring to FIG. 10, a metalized laminate 31 is prepared by depositing a thin layer of metal on one side of a clear plastic film. A lamination adhesive 33 is then applied to the metalized laminate 31, preferably on the side of the film on which the layer of metal has been deposited.

Figure 11:
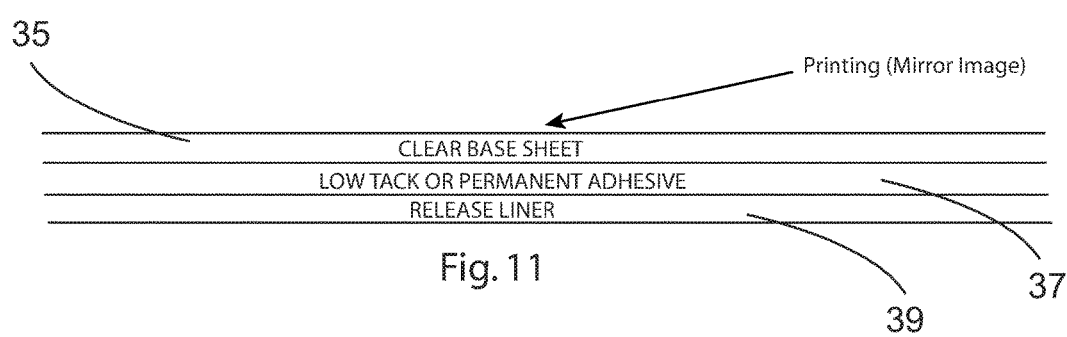
FIG. 11 is a schematic side elevation view of a second component of the fourth embodiment of the invention.

One side of a clear base sheet 35 shown in FIG. 11 is coated with a low tack or permanent adhesive 37 which is then covered with a release liner 39 to protect the low tack or permanent adhesive 37.

The surface of the clear base sheet 35 opposite the surface the surface coated with the low tack or permanent adhesive 37 is then printed with text and or graphics, in reverse (mirror image). The printed text and or graphics may be opaque or translucent, in whole or in part, depending on whether and where the metal laminate is to be visible through the printing to form the construction shown.

Figure 12:
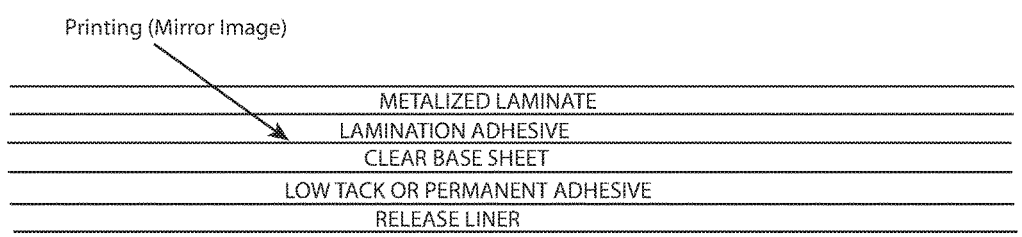
FIG. 12 is a schematic side elevation view of the fourth embodiment of the invention.

Thereafter the metalized laminate 31 is bonded to the side of the clear base sheet 35 opposite the side having the low tack or permanent adhesive 37 covered by the release liner 39 by a lamination adhesive 33 to form the window cling shown in FIG. 12.

The release liner 39 is peeled away from the clear base sheet 35 just before the window cling is to be applied to the surface of a window.

In order to prepare a window cling with a one sided window graphic clear base sheet static cling with no adhesive the following steps are taken.

Figure 13:
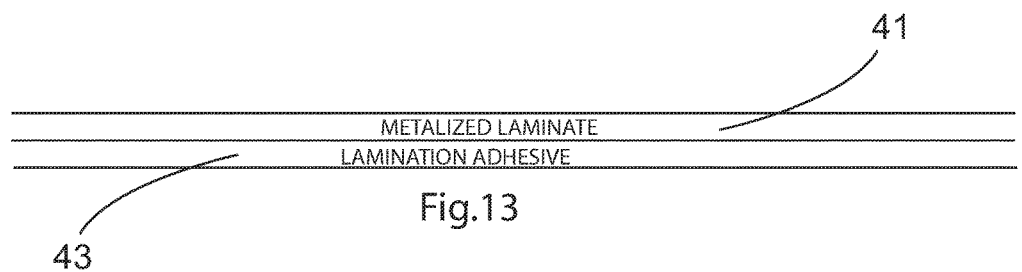
FIG. 13 is a schematic side elevation view of a first component of a fifth embodiment of the invention.

Referring to FIG. 13, a metalized laminate 41 is prepared by depositing a thin layer of metal on one side of a clear plastic film. A lamination adhesive 43 is then applied to the metalized laminate 41, preferably on the side of the film on which the layer of metal has been deposited.

Figure 14:
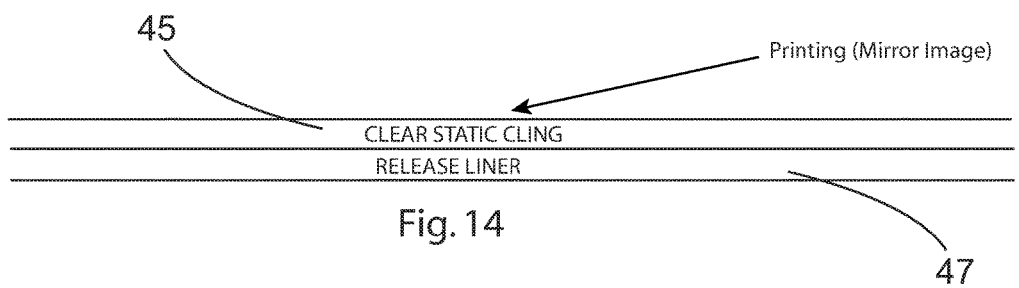
FIG. 14 is a schematic side elevation view of a second component of the fifth embodiment of the invention.

One side of a clear static cling 45 shown in FIG. 14 is covered with a release liner 47.

The surface of the clear static cling 45 opposite the surface with the release liner 47 is then printed with text and or graphics, in reverse (mirror image). The printed text and or graphics may be opaque or translucent, in whole or in part, depending on whether and where the metal laminate is to be visible through the printing to form the construction shown.

Figure 15:
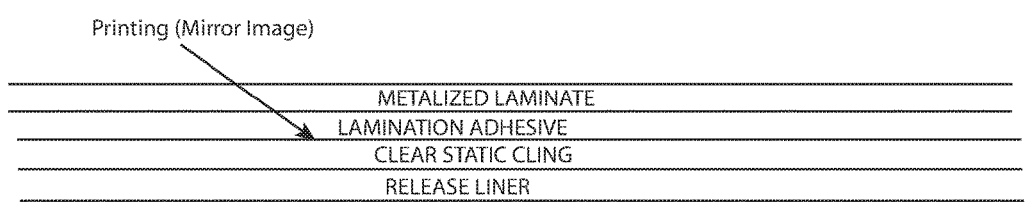
FIG. 15 is a schematic side elevation view of the fifth embodiment of the invention.

Thereafter the metalized laminate 41 is bonded to the side of the clear static cling 45 opposite the side covered by the release liner 47 by a lamination adhesive 43 to form the window cling shown in FIG. 15.

The release liner 47 is peeled away from the clear static cling 45 just before the window cling is to be applied to the surface of a window.

Figure 16:
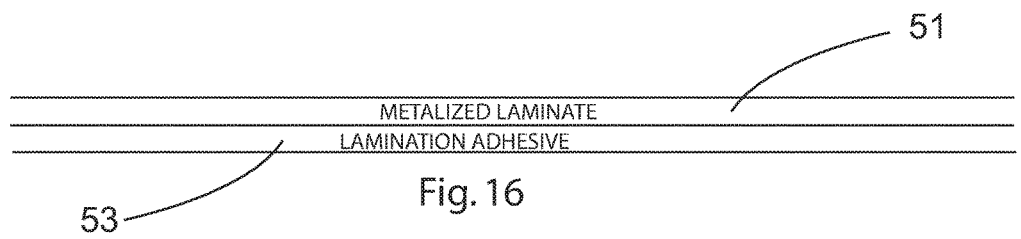
FIG. 16 is a schematic side elevation view of a first component of a sixth embodiment of the invention.

In order to prepare a window cling with a one sided window graphic clear base sheet with no adhesive the following steps are taken Referring to FIG. 16, a metalized laminate 51 is prepared by depositing a thin layer of metal on one side of a clear plastic film. A lamination adhesive 53 is then applied to the metalized laminate 51, preferably on the side of the film on which the layer of metal has been deposited.

Figure 17:
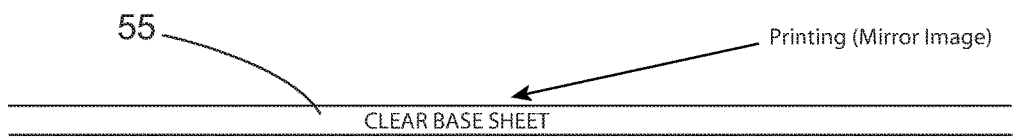
FIG. 17 is a schematic side elevation view of a second component of the sixth embodiment of the invention.

A surface of a clear base sheet 55, shown in FIG. 17, is printed with text and or graphics, in reverse (mirror image). The text and or graphics may be opaque or translucent, in whole or in part, depending on whether and where the metal laminate is to be visible through the printing to form the construction shown.

Figure 18:
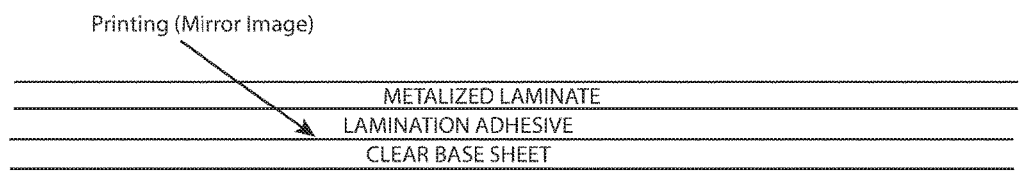
FIG. 18 is a schematic side elevation view of the sixth embodiment of the invention.

Thereafter the metalized laminate 51 is bonded to the side of the clear base sheet 55 having the printing to form the window cling shown in FIG. 18. An adhesive (not shown), e.g., of the liquid, low tack, or permanent type may be applied to the surface of the clear base sheet 55 opposite the metal laminate before applying the window cling to a window.

In order to prepare a window cling with a one sided window graphic white base sheet with low tack or permanent adhesive the following steps are taken.

Figure 19:
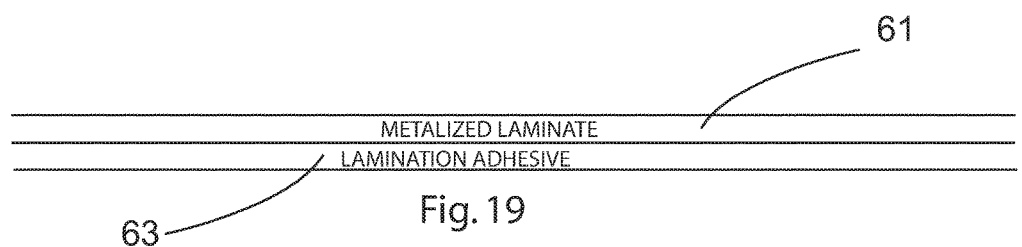
FIG. 19 is a schematic side elevation view of a first component of a seventh embodiment of the invention.

Referring to FIG. 19, a metalized laminate 61 is prepared by depositing a thin layer of metal on one side of a clear plastic film. A lamination adhesive 63 is then applied to the metalized laminate 61, preferably on the side of the film on which the layer of metal has been deposited.

Figure 20:
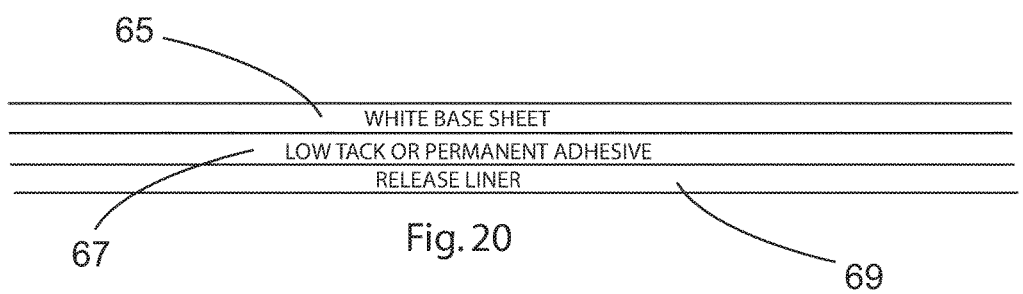
FIG. 20 is a schematic side elevation view of a second component of the seventh embodiment of the invention.
Figure 21:
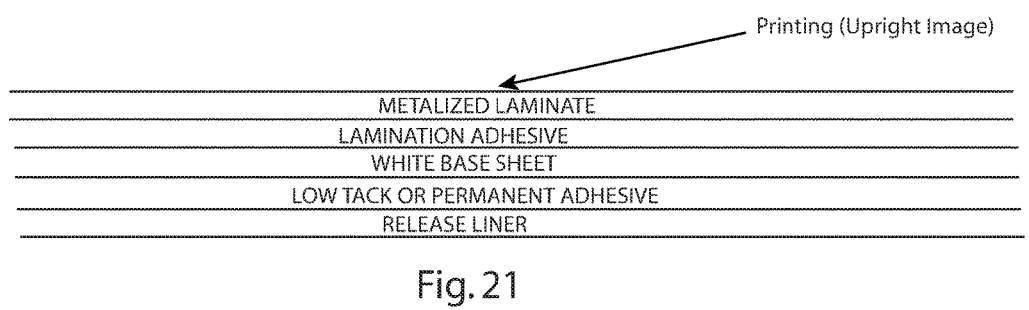
FIG. 21 is a schematic side elevation view of the seventh embodiment of the invention.

One side of a white base sheet 65 shown in FIG. 20 is coated with a low tack or permanent adhesive 67 which is then covered with a release liner 69 to protect the low tack or permanent adhesive 67. Thereafter the metalized laminate 61 is bonded to the side of the white base sheet 65 opposite the side having the low tack or permanent adhesive 67 covered by the release liner 69 by a lamination adhesive 63 to form the window cling shown in FIG. 21.

Upright (unreversed) printing is applied to the exposed surface of the metal laminate, i.e., opposite the surface to which the lamination adhesive 63 is applied, after the metal laminate has been applied to the white base sheet 65.

The release liner 69 is peeled away from the white base sheet 65 just before the window cling is to be applied to the surface of a window.

In order to prepare a window cling with a one sided static cling window graphic white base sheet with no adhesive the following steps are taken.

Referring to FIG. 22, a metalized laminate 71 is prepared by depositing a thin layer of metal on one side of a clear plastic film. A lamination adhesive 73 is then applied to the metalized laminate 71, preferably on the side of the film on which the layer of metal has been deposited.

One side of a white static cling 75 shown in FIG. 23 is covered with a release liner 77.

Thereafter the metalized laminate 71 is bonded to the side of the white static cling 75 opposite the side covered by the release liner 77 by a lamination adhesive 73 to form the window cling shown in FIG. 24.

Upright (unreversed) printing is applied to the exposed surface of the metal laminate, i.e., opposite the surface to which the lamination adhesive 73 is applied, after the metal laminate has been applied to the white static cling 75.

The release liner 77 is peeled away from the white static cling 75 just before the window cling is to be applied to the surface of a window.

Figure 25:
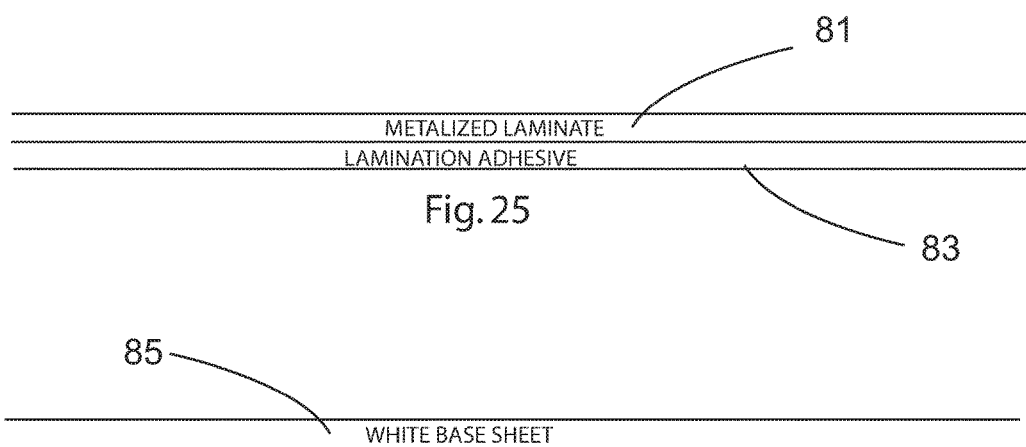
FIG. 25 is a schematic side elevation view of a first component of a ninth embodiment of the invention.

In order to prepare a window cling with a one sided window graphic white base sheet with no adhesive the following steps are taken Referring to FIG. 25, a metalized laminate 81 is prepared by depositing a thin layer of metal on one side of a clear plastic film. A lamination adhesive 83 is then applied to the metalized laminate, preferably on the side of the film on which the layer of metal has been deposited.

Figure 26:
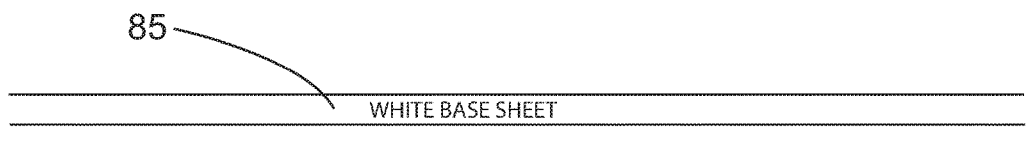
FIG. 26 is a schematic side elevation view of a second component of the ninth embodiment of the invention.
Figure 27:
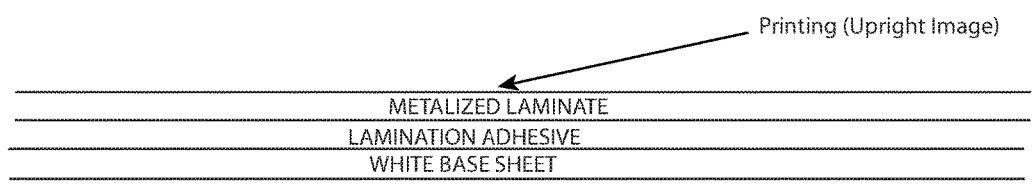
FIG. 27 is a schematic side elevation view of the ninth embodiment of the invention.

Thereafter the metalized laminate 81 is bonded to a surface of a white base sheet 85, shown in FIG. 26, to form the window cling shown in FIG. 27. An adhesive (not shown), e.g., of the liquid, low tack, or permanent type may be applied to the surface of the white base sheet 85 opposite the metal laminate before applying the window cling to a window.

Upright (unreversed) printing is applied to the exposed surface of the metal laminate, i.e., opposite the surface to which the lamination adhesive 83 is applied, after the metal laminate has been applied to the white base sheet 85.

It is to be appreciated that the foregoing disclosure is of 9 preferred embodiments of the invention to which modifications and alterations may be made without departing from the spirit and scope of the invention.

What is claimed is:

1. A window sign comprising,
    a base sheet having a first surface and an opposite second surface,
    a metalized laminate having a first surface and an opposite second surface,
    a layer of lamination adhesive in contact with said first surface of said base sheet and said second surface of said metalized laminate, said lamination adhesive adhering said base sheet and metalized laminate together,
    wherein said second surface of said base sheet is coated with an adhesive and further comprising a peelable release liner adhered to said adhesive coated base sheet second surface.

2. A window sign according to claim 1 wherein said base sheet comprises a static cling, and further comprising a peelable release liner adhered to said second surface of said base sheet.

3. A window sign according to claim 1 wherein said first surface of said metalized laminate is printed with a first image unreversed.

4. A window sign according to claim 3 wherein at least a portion of said first image is translucent and light reflected by said metalized laminate is transmitted through said first image portion.

5. A window sign according to claim 3 wherein said base sheet is transparent.

6. A window sign according to claim 5 wherein said first surface of said base sheet is printed with a second image in reverse that is visible unreversed through said second surface of said base sheet, said window sign being a two sided window sign, said first image being unreversed and visible and said second image not being visible when said sign is viewed from one side, and said second image being unreversed and visible and said first image not being visible when said sign is viewed from an opposite side.

7. A window sign according to claim 1 wherein said base sheet is opaque.

8. A window sign according to claim 1 wherein said base sheet is transparent.

9. A window sign according to claim 8 wherein said first surface of said base sheet is printed with a second image in reverse that is visible unreversed through said second surface of said base sheet.

10. A window sign according to claim 9 wherein an area of said metalized laminate is visible through said second surface of said base sheet.

11. A window sign according to claim 9 wherein at least a portion of said second image is translucent and light reflected by said metalized laminate is transmitted through said second image.

12. A method of making a window sign comprising,
    adhering a first surface of a base sheet to a second surface of a metalized laminate having a first surface opposite said second surface,
    printing said first surface of said materialized laminate with a first image unreversed,
    wherein said base sheet is transparent and further comprising, before adhering said first surface of said base sheet to said second surface of said metalized laminae, printing said first surface of said base sheet with a second image reversed, said second image being at least partially visible through said second surface of said base sheet unreversed.

13. A method of making a window sign according to claim 12 wherein said base sheet is transparent and further comprising printing said first surface of said base sheet with a second image reversed, said second image being visible unreversed through said second surface of said base sheet.

14. A method according to claim 12 further comprising coating said second surface of said base sheet with an adhesive and applying a peelable release liner to said adhesive on said base sheet second surface.

15. A method according to claim 12 wherein said base sheet comprises a static cling, and further comprising applying a peelable release liner to said base sheet second surface.

16. A window sign comprising,
    a transparent base sheet having a first surface and an opposite second surface, wherein said first surface of said base sheet is printed with a second image in reverse that is visible unreversed through said second surface of said base sheet,
    a metalized laminate having a first surface printed with a first image unreversed and an opposite second surface,
    a layer of lamination adhesive in contact with said first surface of said base sheet and said second surface of said metalized laminate, said lamination adhesive adhering said base sheet and metalized laminate together,
    said window sign being a two sided window sign, said first image being unreversed and visible and said second image not being visible when said sign is viewed from one side, and said second image being unreversed and visible and said first image not being visible when said sign is viewed from an opposite side.

17. A method of making a window sign comprising,
    adhering a first surface of a base sheet to a second surface of a metalized laminate having a first surface opposite said second surface,
    coating said second surface of said base sheet with an adhesive and
    applying a peelable release liner to said adhesive on said base sheet second surface.

* * * * *